United States Patent [19]

Eckardt et al.

[11] 4,401,471
[45] Aug. 30, 1983

[54] INORGANIC CELLULAR MATERIAL AND PROCESS FOR THE MANUFACTURE THEREOF

[75] Inventors: Peter Eckardt, Hofheim am Taunus; Walter Dürsch, Königstein, both of Fed. Rep. of Germany

[73] Assignee: Hoechst Aktiengesellschaft, Frankfurt am Main, Fed. Rep. of Germany

[21] Appl. No.: 332,235

[22] Filed: Dec. 18, 1981

[30] Foreign Application Priority Data

Dec. 20, 1980 [DE] Fed. Rep. of Germany ....... 3048354
Oct. 8, 1981 [DE] Fed. Rep. of Germany ....... 3140011

[51] Int. Cl.³ ............................................. C04B 21/02
[52] U.S. Cl. ........................................ 106/87; 501/84
[58] Field of Search ............................ 106/87; 501/84

[56] References Cited

U.S. PATENT DOCUMENTS 4,084,980  4/1978  Motoki .................................. 106/87

Primary Examiner—James Poer
Attorney, Agent, or Firm—Berman, Aisenberg & Platt

[57] ABSTRACT

An inorganic, phosphate-containing cellular material is manufactured from Portland cement, polyphosphoric acid and an expanding agent acting in an acidic medium. There may be added furthermore aluminous cement, oxides of calcium, zinc, aluminum, iron, hydroxides of aluminum and iron, fillers and reinforcing agents. By intense intermixing of the starting products a mixture is prepared which has an equivalent ratio of (Al+Mg+CA+Fe) to phosphate of 0.8:1 to 3.0:1. The mixture foams, is charged to a mold, heated if necessary to a temperature of 80° C., and after completed exothermal reaction hardened under heat.

23 Claims, No Drawings

INORGANIC CELLULAR MATERIAL AND PROCESS FOR THE MANUFACTURE THEREOF

The present invention provides a novel inorganic cellular material and a process for the manufacture thereof with the use of Portland cement and polyphosphoric acid.

Inorganic cellular materials on the basis of gypsum or cement are state of the art. However, because of their high density, which normally is not below 400 g/l, their heat insulation values are poor as compared to the light organic foams. Due to their manufacturing conditions, light inorganic cellular materials manufactured from waterglass contain a large amount of easily soluble salts which may cause blooming if the alkali metal salts are not removed later on.

Asbestos-containing cellular materials have the advantage of a certain mechanical flexibility; their disadvantage, however, resides in an extreme health hazard caused by the raw material.

U.S. Pat. No. 3,382,082 describes inorganic cellular materials which are manufactured from free aqueous phosphoric acid and aluminum hydroxide with addition of small amounts of a gas developing metal powder (for example aluminum) and of finely dispersed aluminum phosphate. In this process, phosphoric acid and aluminum hydroxide are always converted to primary aluminum phosphate, while the formation of secondary or tertiary aluminum phosphate depends on the presence of sufficient amounts of aluminum hydroxide. Mechanical stabilization of the foamed article is brought about by drying at 95°–100° C.

In column 1 of U.S. Pat. No. 3,762,935, it is stated with respect to this process that the foam partially crumbles on hardening. It is therefore recommended to replace the solid aluminum phosphate by ground glass frit when preparing the cellular material. Furthermore, the foamed article should be heated to about 500°–1,100° C. after drying, so that the glass frit can melt and coat the inner surfaces of the pores. The disadvantage of this latter process resides in the necessity of hardening the cellular material at elevated temperatures.

Moreover, the reaction of aluminum hydroxide or aluminum oxide with free phosphoric acid is extremely exothermal and proceeds very rapidly, so that there is a risk that the reaction batch may become too hot and the gases formed from the expanding agent may be driven off by vaporizing water.

In German Offenlegungsschrift No. 2,114,735, a porous, flame-proof, insulating material is described. It is prepared for example from a liquid mixture of dilute phosphoric acid and a 50% solution of monoaluminum phosphate in water, and a solid mixture of calcium aluminate and alkali metal silicate, optionally with addition of flame-proof substances, such as quartz sand, and a metal powder which acts as expanding agent in an acidic medium. As calcium aluminate, aluminous cement is used. However, the products so manufactured are rather heavy (density above 550 g/dm$^3$). Since aqueous solutions are used as starting materials, the products contain a large amount of water which evaporates at elevated temperatures. When they are heated to about 500° C., there is considerable shrinkage with formation of cracks.

It is therefore the object of the invention to provide an inorganic cellular material having good mechanical and thermal properties, which is free from the disadvantages of the products according to the state of the art, and which can be manufactured in a simple and economic manner.

In accordance with the invention, a process is provided for the manufacture of a phosphate-containing inorganic cellular material from cement, a phosphoric acid and an expanding agent, which comprises preparing a mixture of Portland cement, optionally together with aluminous cement and/or oxides of calcium, magnesium, zinc, aluminum and iron, and/or hydroxides of aluminum and/or iron, and of polyphosphoric acid containing at least 76 weight % of P$_2$O$_5$, and of an expanding agent acting in an acidic medium, optionally with addition of fillers and/or reinforcing agents, by intense intermixing; the equivalent ratio (aluminum+magnesium+calcium+iron) to phosphate being in a range of from 0.8:1 to 3.0:1 and the amount of expanding agent being dosed in such a manner that in the reaction with polyphosphoric acid from 0.5 to 8 ml of gas are set free per g of mixture; charging the foaming mixture to a mold, heating it, if necessary, from the outside to 80° C., and hardening it under heat after completed exothermal reaction.

Hardening under heat may be carried out by heating further to a temperature of at least 250° C. and maintaining this temperature for at least 5 minutes. A temperature of 700° C., however, should not be exceeded. Preferred is a temperature in the range of from 250° to 350° C.

The cellular material can be removed from the mold immediately after the exothermal reaction is complete. According to this variant of the invention, however, it is recommended to remove it after hardening at a temperature of at least 250° C. only, advantageously after cooling.

In the case where the equivalent ratio of (Al+Mg+Ca+Fe) to phosphate is greater than 1.0:1, the foamed mixture may also be hardened by treatment with superheated steam of at least 2 bar. In this variant, the cellular material is preferably removed from the mold after the exothermal reaction is complete, and thus to facilitate penetration of the steam. In the case however where a mold is used which is permeable to steam, it may be removed after hardening of the cellular material.

It is surprising that at equivalent ratios of (aluminum+magnesium+calcium+iron) to phosphate of more than 1.0:1, that is, at an excess of basic component, valuable, mechanically stable cellular materials are still obtained. It was to be expected that at such equivalent ratios there would be an excess of the Portland cement having a heavily alkaline reaction, and that this excess would be converted to ortho-phosphates in a rapid exothermal reaction with the polyphosphoric acid. This reaction indeed occurs very rapidly only when there is enough water. Tertiary ortho-phosphates do not contain hydroxy groups any more and are therefore unable for cross-linkage by splitting off water to give ultra-phosphates.

However, it has been observed that even at a considerable excess of Portland cement relative to the equivalent ratio (aluminum+magnesium+calcium+iron) to phosphate of more than 1.0 to 3.0:1 the foaming mixture has still an acidic reaction. Mixtures having an equivalent ratio of above 3, for example of 5 to 10:1, still have an acidic reaction after foaming; however, they cannot be mixed satisfactorily any longer.

Without the thermal after-treatment, the cellular material would have an acidic reaction on treatment with water and thus be destroyed.

When hardening the cellular material by the action of steam, the minimum reaction time depends on the partial pressure of the water vapor applied. At a steam pressure of 10 bar, one hour already is sufficient, at 4 bar, about 2 hours, and at 2 bar, about 10 hours are required for hardening. A still longer heating with steam, although causing no damage, does not increase the strength but insignificantly. It is therefore recommended to stop the treatment when the intended mechanical properties are attained. Supposedly, silicium dioxide from the Portland cement set free by acid reacts in the hardening step with the excess of cement to give calcium hydrosilicate which imparts an excellent strength to the cellular material.

Preferred Portland cement types are PZ 35, PZ 45 and PZ 55, especially PZ 35. A maximum content of $2CaO.SiO_2$, $3CaO.SiO_2$ and $3 CaO.Al_2O_3$ in the cement is desirable. Portland cement may be replaced in part by mixtures of Portland cement and blast furnace slag (so-called slag or Hochofen cement). Advantageously, the amount of Portland cement should not be below 60, preferably 70, weight %, relative to the sum of solid amounts.

Relative to the weight of the Portland cement, up to 43%, preferably up to 30%, especially from 1 to 20% of aluminous cement and/or oxides of calcium, magnesium, zinc, aluminum and iron, and/or hydroxides of aluminum and/or iron may be present. It is especially preferred that the amount of these components is from 3 to 6% (relative to the weight of the Portland cement). Advantageously, these components are used in a finely ground form.

Suitable for the reaction are commercial polyphosphoric acids containing at least 76, preferably 84, % of $P_2O_5$. These acids do not crystallize even on prolonged storage.

As expanding agents, there are used mainly carbonates, especially carbonates containing water of crystallization, such as the basic magnesium carbonate of the formula $4MgCO_3.Mg(OH)_2.5H_2O$. Small amounts of alkaline earth carbonate are contained in the Portland cement from the start, and act also as expanding agent.

Aluminum and iron powder are not very efficient in the process of the invention, although they can be well used as expanding agent in the presence of aqueous phosphoric acid.

Suitable expanding agents are furthermore easily volatile organic compounds, such as fluorohydrocarbons. Likewise suitable are organic compounds which at elevated temperatures disintegrate to gaseous products, such as azo-dicarbonamide or azo-isobutyric acid dinitrile.

The amount of expanding agent should be chosen in such a manner that in the reaction with the polyphosphoric acid from 0.5 to 8 ml of gas (measured at 80° C. and 1 bar) are set free per g of reaction mixture. Preferred are gas amounts of from 3 to 7 ml per g of reaction mixture.

Finely ground fillers can be added to the reaction mixture without influencing the mechanical and thermal properties of the final product to a significant extent. These fillers must not react either with the polyphosphoric acid or with the metal phosphates, even at 100° C. Suitable for this application is a wide range of industrial waste products such as fly-ash which consist mainly of silicium dioxide and is obtained in the manufacture of ferrosilicon. There may be furthermore used quartz powders, kaolin, carbon black, talc or finely ground graphite. In the case where these fillers contain small amounts of still reactive oxides, such as aluminum oxide, these amounts have to be taken into consideration on calculation of the batch.

By using inorganic fibers as reinforcing agents instead of or in addition to the pulverulent fillers the mechanical stability of the cellular material obtained is improved. These reinforcing agents, too, must be inert to polyphosphoric acid or metal phosphate. Preferably glass fibers or mineral wool fibers cut to short pieces, or carbon fibers are used as reinforcing agents. In addition thereto, small amounts of organic fibers having a high melting point, such as aromatic polyamides, can be incorporated, as far as the cellular material obtained is not to be subjected to temperatures above 300° C.

In order to ensure the reaction to proceed smoothly, the reactants must be thoroughly mixed. Preferably, the solid components are mixed first, for example by grinding them together. For accelerating the reaction, a small amount of water (0.1 to 1 weight %), relative to polyphosphoric acid, may be added. Advantageously, the water is added in the form of salts containing water of crystallization (example: basic magnesium carbonate or aluminum sulfate). When adding more than 1% of water, the reaction is often accelerated in such a manner that the time available for processing is not sufficient.

For modifying the properties of the final products, further substances may be added. Ground calcium silicate causes increase of the viscosity of the reacting foam. Sodium silicate has the same effect, although in this case there is the disadvantage of sodium salts blooming out or being washed off on use. Small amounts of boric acid accelerate the reaction, too, and increase the stability of the cellular material obtained to elevated temperatures.

By equivalent ratio, there is to be understood the ratio of the total valencies of the metals to the valencies of the phosphate ions. A formula for this ratio is indicated in German Offenlegungsschrift No. 2,756,198, p. 13.

The mixtures of polyphosphoric acid and optionally other components foams slowly, Simultaneously, the temperature rises. When about 80° C. are attained, the temperature rises rapidly to about 200° C., while a simultaneous further expansion of the material occurs. If the temperature of 80° C. does not establish itself, the batch must be heated from the outside. Heating is in most cases necessary to raise the temperature of the cellular material to at least 250° C., generally 250° to 300° C. Without this thermal after-treatment or heating with superheated steam the cellular material would have an acidic reaction on washing with water. Prolonged heating of more than 5 minutes at temperatures of at least 250° C. is possible but does not bring about any further advantage.

Polyphosphoric acid reacts with metal oxides, such as CaO, MgO or ZnO, in a few seconds in an extremely vigorous reaction, yielding a solid mass from which a cellular material cannot be obtained.

Similarly, Portland cement reacts with equivalent amounts of orthophosphoric acid (75–100 weight % of $H_3PO_4$) in such a rapid manner that the mass cannot be mixed homogeneously and becomes solid immediately when adding water. It is therefore surprising that the reaction of polyphosphoric acid with Portland cement can be used for the manufacture of a cellular material.

Depending on the amount of Portland cement, the equivalent weight chosen and the quantity of gas set free, the properties of the cellular material obtained can be modified to a considerable extent. The material has a density of from 100 to 500 g/l and open and closed cellular pores having a diameter of from 0.5 and 3 mm. The volume ratio of solids to pores after the gas development and solidification of the material can be in a range of from about 1:5 to 1:20, which corresponds to a density of 450 to 100 g/l, respectively. Preferred is a volume ratio of solids to pores of from 1:8 (density 250 g/l) to 1:15 (density about 150 g/l). The cellular material has generally the following composition:

- 18–50 weight % CaO
- 2–20 weight % $Al_2O_3$
- 5–35 weight % $SiO_2$
- 15–50 weight % $P_2O_5$
- 0–1 weight % alkali metal oxides
- 0–8 weight % ZnO, MgO, FeO, and/or $Fe_2O_3$
- 0–2 weight % $SO_3$
- 0–5 weight % C
- 0–8 weight % $B_2O_3$ The properties (for example density, pore size, compressive and tensile strength, heat resistance) of the products depends on the equivalent ratio metal/phosphate. When this ratio of (Al+Mg+Ca+Fe) to phosphate is from 0.8:1 to 1.0:1, hardening at 250° C. without superheated steam is preferred. The cellular material obtained in this case contains from 18 to 45 weight % of CaO, 5 to 20 weight % of $SiO_2$ and 38 to 50 weight % of $P_2O_5$.

Preferred are cellular materials where the weight ratio of $(Al_2O_3+CaO):P_2O_5$ is from 0.8:1 to 1.3:1, especially 0.9:1 to 1.2:1, and preferably from 1.0:1 to 1.15:1.

When the equivalent ratio metal/phosphate is above 1.0:1, but does not exceed 3.0:1, hardening by means of superheated steam should be preferred. Alternatively, the material can be hardened by heat treatment at 250° C. at least. The materials so obtained have generally the following composition:

- 18–50 weight % CaO
- 2–20 weight % $Al_2O_3$
- 5–35 weight % $SiO_3$
- at least 15, but less than 38 weight % $P_2O_5$
- 0–1 weight % alkali metal oxides
- 0–8 weight % $B_2O_3$
- 0–8 weight % ZnO, MgO, FeO and/or $Fe_2O_3$
- 0–2 weight % $SO_3$ and
- 0–5 weight % C.

A preferred $CaO/P_2O_5$ range is indicated by the following equation:

$$53.26 - 0.217 \cdot [P_2O_5] \geq [CaO] \geq 29.56 - 0.304 \cdot [P_2O_5],$$

in which [CaO] and [$P_2O_5$] stand for weight % of CaO and $P_2O_5$, respectively. Preferred contents of $B_2O_3$ are in the range of from 0 to 5, preferably 0.5 to 2.5, weight %. Preferred are furthermore cellular materials in which the weight ratio $(Al_2O_3+CaO):P_2O_5$ is from 1.0:1 to 2.5:1, especially 1.2:1 to 1.8:1, furthermore materials in which the weight ratio of $SiO_2:P_2O_5$ is from 0.4:1 to 1.4:1, especially 0.7:1 to 1.0:1. Preferred composition ranges are from 30 to 45 weight % of CaO, 12 to 25% of $SiO_2$ and 20 to 30% of $P_2O_5$.

The cellular material obtained is especially suitable as non-flammable insulating material, especially for protection against heat losses. It contains generally no organic substances, is resistant to temperatures of up to more than 1,000° C. and does not split off toxic gases.

Foaming can be carried out in nearly all kinds of molds, so that construction elements of any shape, especially plates or prisms, can be manufactured.

The process of the invention for the manufacture of cellular material can be applied also on an industrial scale for thermal insulation of metal pipes of metal vessels etc. The reaction mixture may be charged for example to the space between an inner and an outer wall of a metallic vessel, foamed and hardened. The inorganic cellular material adheres well to nearly all interesting materials.

The following Examples illustrate the invention.

EXAMPLE 1

550 g of Portland cement PZ 35, 20 g of boric acid and 10 g of fine basic magnesium carbonate were finely ground in a ball mill. This mixture was mixed with 400 g of linear polyphosphoric acid having a content of 84% of $P_2O_5$. During agitation, the mass was first friable; after 30 seconds it became pasty while warming slightly. After 1 minute, this mass was introduced into a metal mold, where it expanded to about 10-fold from its initial volume. Within about 3 to 4 minutes, the temperature rose slowly to 72° C. When this temperature was attained, the reaction started, and the cellular material solidified while the temperature rose rapidly to 215° C. The specimen was then heated for ½ hour at 250° C. and thus condensed completely. After cooling, a cellular material having a density of about 200 g/l was obtained.

EXAMPLE 2

440 g of Portland cement PZ 35, 70 g of $Al(OH)_3$, 50 g of fly ash (consisting of 80–90% of $SiO_2$), and 3 g of azo-dicarbonamide were mixed. As indicated in Example 1, the powder was mixed with 400 g of polyphosphoric acid and introduced into a mold. Within 6 minutes, the temperature rose slowly to 70° C., and subsequently very rapidly to 195° C. with heavy inflation of the mixture. The hardened cellular material was after-condensed for 15 minutes at 300° C. A very solid product having a density of about 230 g/l was obtained.

EXAMPLE 3

380 g of Portland cement, 100 g of aluminous cement, 10 g of spray-dried sodium silicate having an average weight ratio $SiO_2/Na_2O$ of 2.0, 12 g of basic magnesium carbonate and 5 g of $Al_2(SO_4)_3 \cdot 18 H_2O$ were well mixed in pulverulent state as indicated in Example 1, and subsequently thoroughly agitated for 30 seconds with 400 g of polyphosphoric acid. After 1 minute, the mass began to foam, and a temperature of 195° C. was attained after 3 minutes already within which the cellular material solidified. For after-condensation, it was heated for a short time at 300° C. This Example demonstrates that by addition of salts containing water of crystallization the reaction can be considerably accelerated.

In all three Examples the thermal shrinkage (measured after tempering at 300° C. for 5 minutes and cooling on the greatest length of the specimen) was below 1%.

EXAMPLE 4

1,470 g or Portland cement PZ 35, 90 g of aluminous cement, 450 g of fly-ash (consisting of 85-90% SiO$_2$), 60 g of boric acid, 60 g of Zn$_3$(PO$_4$)$_2$.4 H$_2$O and 30 g of basic zinc carbonate were finely ground in a ball mill. 1,200 g of polyphosphoric acid containing 84% of P$_2$O$_5$ were introduced into a kneader, and with high-grade cooling by means of water the finely ground powder mixture was introduced into the kneader. During the mixing operation, the temperature was not allowed to exceed 50° C. After 6 minutes of mixing, the pasty mass was removed and charged to molds, wherein the mass expanded to a multiple of the starting volume, while the temperature rose to 220° C. within 8 minutes, and the mass solidified. The specimens were then heated for 10 minutes at 300° C. Thus, an inorganic material having a density of about 220 g/l was obtained.

EXAMPLE 5

205 g of Portland cement PZ 35, 5 g of boric acid, 40 g of a fly-ash (consisting of 80-90% of SiO$_2$), 12 g of finely ground dolomite (grain size 10 microns) and 2 g of basic magnesium carbonate were finely ground in a ball mill within 2 hours.

100 g of linear polyphosphoric acid containing 85% of P$_2$O$_5$ were mixed with 2 g of glass fibers (length 3 mm, diameter 5 microns), and the powder mixture was added with agitation. During agitation, the mass was first friable, and after 30 seconds it became pasty while warming slightly. After a mixing time of 1 minute, the mass was introduced into a metal mold, in which it inflated to the 10-fold starting volume. The temperature rose slowly to 80° C. within 5 minutes. When this temperature was attained, the reaction started and the cellular material solidified with rapid rise of temperature to 215° C. A small specimen was wetted with water; the material had a strongly acidic reaction. After 10 minutes, the cellular material was removed from the mold and introduced into a laboratory autoclave (2 liters). Approximately 200 ml of water were added. The autoclave was heated to 150° C., whereby a pressure of 4.5 bar established itself. After 2 hours, the heat was turned off and the autoclave allowed to cool. A cellular material having a density of about 210 g/l and an excellent compressive strength was obtained. The composition was as follows:
  21.5% SiO$_2$
  3.1% Al$_2$O$_3$
  35.9% CaO
  23.0% P$_2$O$_5$
The remainder consisted of iron oxide, boron oxide, magnesium oxide, water and other substances.

EXAMPLE 6

As indicated in Example 5, 170 g of Portland cement PZ 35, 15 g of finely ground dolomite, 10 g of talc powder (grain size below 20 microns), 30 g of fly-ash (SiO$_2$ filler N produced by SKW Trostberg AG, about 80-90% of SiO$_2$) were finely ground, mixed with 100 g of polyphosphoric acid, and changed into a mold. The temperature rose slowly within 6 minutes to 75° C., while the mixture inflated heavily. Then the mixture reacted with temperature rise to 195° C. The solidified cellular material was heated to 300° C. in a drying cabinet and maintained for 5 minutes at this temperature. After slow cooling, a very solid cellular material having an average pore diameter of 2 mm and a density of 180 g/l was obtained. On a 50 days' storage in water, this material lost only 1.5% of its initial weight.

EXAMPLE 7

As described in Example 5, 145 g of Portland cement PZ 35, 40 g of quartz powder containing more than 99% of silicic acid and having an average grain size of 27 microns, 14 g of finely ground dolomite and 2 g of Al$_2$(SO$_4$)$_3$.18 H$_2$O were well mixed and agitated with 100 g of polyphosphoric acid. After one minute, the mass began to foam, and after 4 minutes it had a temperature of 200° C. The material was removed from the mold and subjected for 1 hour to a steam treatment at 10 bar and 185° C. in an autoclave. After cooling, a solid product having a density of 195 g/l was obtained.

We claim:

1. Inorganic substantially water-free cellular material having a density of from 100 to 500 g/l, open or closed pores having a diameter of from 0.5 to 3 mm, a thermal shrinkage of below 1%, the following composition in the solid phase:
  18-50 weight % CaO
  2-20 weight % Al$_2$O$_3$
  5-35 weight % SiO$_2$
  15-50 weight % P$_2$O$_5$
  0-1 weight % alkali metal oxides
  0-8 weight % ZnO, MgO, FeO, and/or Fe$_2$O$_3$
  0-2 weight % SO$_3$
  0-5 weight % C
  0-8 weight % B$_2$O$_3$
and an equivalent ratio of (Al+Mg+Ca+Fe) to phosphate of from 0.8:1 to 3.0:1.

2. A cellular material as claimed in claim 1 having the following composition in the solid phase:
  18-45 weight % CaO
  5-20 weight % SiO$_2$
  38-50 weight % P$_2$O$_5$ 3. A cellular material as claimed in claim 2 having an equivalent ratio of (Al+Mg+Ca+Fe) to phosphate of from 0.8:1 to 1.0:1.

4. A cellular material as claimed in claim 1 having the following composition in the solid phase:
  18-50 weight % CaO
  2-20 weight % Al$_2$O$_3$
  5-35 weight % SiO$_2$
  at least 15, but less than 38, weight % P$_2$O$_5$
  0-1 weight % alkali metal oxide
  0-8 weight % B$_2$O$_3$
  0-8 weight % ZnO, MgO, FeO, and/or Fe$_2$O$_3$
  0-2 weight % SO$_3$ and
  0-5 weight % C.

5. A cellular material as claimed in claim 4, wherein the equivalent ratio of (aluminum+calcium+iron+magnesium) to phosphate is greater than 1.0:1 but does not exceed 3.0:1.

6. A process for manufacturing a phosphate-containing inorganic cellular material from cement, a phosphoric acid and an expanding agent, the process comprising:
  (a) preparing a mixture of Portland cement, polyphosphoric acid containing at least 76 weight percent of P$_2$O$_5$ and an expanding agent which acts in acidic medium by intense intermixing, the mixture having at most about one percent of water and an amount of expanding agent which is sufficient to set free from 0.5 to 8 ml of gas per g of mixture upon reacting with the polyphosphoric acid,
(b) effecting intense intermixing to produce a foaming mixture,
(c) charging a mold with the resulting foaming mixture,
(d) completing an exothermal reaction in said mixture and
(e) hardening the mixture under heat after completing the exothermal reaction;
the mixture of step (a) having an equivalent ratio of (aluminum+magnesium+calcium+iron) to phosphate in a range of from 0.8:1 to 3.0:1.

7. A process according to claim 6 wherein the mixture of step (a) comprises at least one member selected from the group consisting of aluminous cement, calcium oxide, magnesium oxide, zinc oxide, aluminum oxide, iron oxide, aluminum hydroxide and iron hydroxide.

8. A process according to claim 7 wherein the mixture of step (a) comprises at least one member selected from the group consisting of filler and reinforcing agent.

9. A process according to claim 6 wherein the mixture of step (a) comprises at least one member selected from the group consisting of filler and reinforcing agent.

10. A process according to claim 6 which comprises heating to 80° C. during step (d).

11. A process according to claim 6 wherein step (e) comprises heating said mixture to a temperature of at least 250° C. and maintaining it at that temperature for at least 5 minutes.

12. A process according to claim 7 wherein step (a) comprises heating said mixture to a temperature of at least 250° C. and maintaining it at that temperature for at least 5 minutes.

13. A process according to claim 8 wherein step (a) comprises heating said mixture to a temperature of at least 250° C. and maintaining it at that temperature for at least 5 minutes.

14. A process according to claim 10 wherein step (a) comprises heating said mixture to a temperature of at least 250° C. and maintaining it at that temperature for at least 5 minutes.

15. A process according to claim 6 wherein the equivalent ratio of the mixture of step (a) is greater than 1.0:1, but does not exceed 3.0:1, and the hardening of step (e) comprises treating said foamed mixture with superheated steam of at least 2 bars.

16. A process according to claim 7 wherein the equivalent ratio of the mixture of step (a) is greater than 1.0:1, but does not exceed 3.0:1, and the hardening of step (e) comprises treating said foamed mixture with superheated steam of at least 2 bars.

17. A process according to claim 8 wherein the equivalent ratio of the mixture of step (a) is greater than 1.0:1, but does not exceed 3.0:1, and the hardening of step (e) comprises treating said foamed mixture with superheated steam of at least 2 bars.

18. A process according to claim 10 wherein the equivalent ratio of the mixture of step (a) is greater than 1.0:1, but does not exceed 3.0:1, and the hardening of step (e) comprises treating said foamed mixture with superheated steam of at least 2 bars.

19. A process according to claim 15 wherein the equivalent ratio of the mixture of step (a) does not exceed 2.0:1.

20. A process according to claim 16 wherein the equivalent ratio of the mixture of step (a) does not exceed 2.0:1.

21. A process according to claim 17 wherein the equivalent ratio of the mixture of step (a) does not exceed 2.0:1.

22. A process according to claim 18 wherein the equivalent ratio of the mixture of step (a) does not exceed 2.0:1.

23. A cellular material as claimed in claim 4 wherein the equivalent ratio of (aluminum+calcium+iron+magnesium) to phosphate is greater than 1.0:1, but does not exceed 2.0:1.

* * * * *